UNITED STATES PATENT OFFICE.

OTTO CHRISTIAN HAGEMANN, OF LONDON, ENGLAND, AND EBENEZER KENNARD MITTING, OF CHICAGO, ILLINOIS, ASSIGNORS TO JAMES S. KIRK & CO., OF CHICAGO, ILLINOIS.

TREATMENT OF SPENT SOAP-LYE.

SPECIFICATION forming part of Letters Patent No. 465,474, dated December 22, 1891.

Application filed September 26, 1890. Serial No. 366,260. (No specimens.)

*To all whom it may concern:*

Be it known that we, OTTO CHRISTIAN HAGEMANN, residing at London, England, and EBENEZER KENNARD MITTING, residing at Chicago, in the county of Cook and State of Illinois, both subjects of the Queen of Great Britain and Ireland, have invented certain new and useful Improvements in the Treatment of Spent Soap-Lye, of which the following is a specification.

Our invention relates to the treatment of spent soap-lye for the recovery of useful and valuable products therefrom.

The spent soap-lye as run from the soap-pan consists of water containing in solution glycerine derived from the fat from which the soap has been made, chloride of sodium, (or other equivalent salt) which has been used for "salting out" the soap, and a varying small proportion of free alkali, usually in the form of sodium hydrate or carbonate, and soapy, fatty, resinous, and albuminous matters, some of these latter being held in suspension as well as in solution. Various processes have been devised for removing the impurities and recovering the glycerine and salt as useful and valuable products from the soap-lye. Such processes have consisted of steps relating on the one hand to the removal or neutralization of the free alkali present in the lye, and on the other hand to the removal of the organic impurities therefrom, leaving finally a purified solution consisting of water, glycerine, and salt, and from which the water is eliminated by vaporization and the glycerine and salt thus recovered. The removal or neutralization of the free alkali has hitherto been performed in one of two ways—namely, the removal by adding to the lye and boiling with it a substance with which the alkali would combine and the alkali thus removed in the combined form—and to this end the lye has usually been first treated with lime or its equivalent to causticize the free carbonated alkali present, and thus bring it into better condition to be absorbed or taken up by the substances afterward added for this purpose, and the "limed" lye has sometimes been concentrated to a greater or less extent before the addition of such substances. The substances employed have been fats, fatty acids, and resin, and examples of processes containing these steps may be found in United States Patents No. 385,105, June 26, 1888, Nos. 428,509 and 428,510, May 20, 1890, and in the pending application of Albert Domeier and Otto Christian Hagemann, Serial No. 320,021. The neutralization of the alkali has usually been effected by the addition to the lye of a suitable acid until neutralization-point is reached, and the product of this reaction remaining for the time being dissolved in the lye is afterward recovered therefrom in the form of a salt—for instance, chloride of sodium, in the case where hydrochloric acid has been used for such neutralization, or as sulphate of sodium in the case of sulphuric acid having been employed.

To remove the organic impurities from the lye, recourse has been had to means for rendering such impurities insoluble, so that they could be removed by precipitation or filtration. The means employed to render these impurities insoluble have been, on the one hand, the addition of acids which threw them out of solution, and on the other hand the addition of certain metallic salts which were capable of forming insoluble metal-fat compounds, while in either case the albuminous impurities are coagulated and precipitated when the lye is brought to the neutral condition. Examples of processes containing such steps may be found in United States Patents No. 371,127, October 4, 1887, No. 385,105, June 26, 1888, No. 385,367, July 3, 1888, No. 413,619, October 22, 1889, Nos. 428,509 and 428,510, May 20, 1890, and in the pending applications of Albert Domeier and Otto Christian Hagemann, Serial Nos. 301,676 and 320,021.

The preliminary treatment of the lye with the lime above referred to has also for its object the removal therefrom of certain soapy matters which would, if allowed to remain, cause frothing or boiling over, and thus retard the preliminary partial concentration of the lye, and which partial concentration forms a useful step in connection with some processes.

In conjunction with the acid treatment above referred to for rendering insoluble the fatty and resinous impurities in the lye it has also been found desirable to employ some substance of the nature of a carrier or collector in order to facilitate the precipitation or filtration of the insoluble impurities from the liquor. Examples of such carrier or collector may be found in United States Patents Nos. 371,127 and 428,509. The acid hitherto used in this industry has for the most part been hydrochloric acid, as this, in combination with the alkali already existing in the spent soap-lye, forms chloride of sodium—a product of value to the soap-maker and regularly employed by him in salting out his soap.

As is well known, the hydrochloric acid of commerce contains only twenty-five to thirty per cent. of real hydrochloric acid, (HCl,) the balance of seventy to seventy-five per cent. being water, and as is also well known such hydrochloric acid is difficult and costly to transport, having to be conveyed in glass carboys at comparatively high rates of freight consistent with the danger, risk of breakage, &c. To overcome these objections to the use of this acid in places at a distance from the seat of production, and, above all, to provide a cheap and effective method of accomplishing the desired end, are the objects of this invention.

We have discovered that in chloride of calcium we have a substance which accomplishes the purification of the spent soap-lye, and which, moreover, is a solid body easily transported and free from the objectionable features connected with the handling of liquid acids, and which at the same time is more economical in use than mineral acids, it being produced in large quantities as a by-product in the manufacture of alkali, and only a small percentage of it being turned to profitable use, while at the same time producing from its reaction upon the free alkali in the spent-lye chloride of sodium, which is recovered for use again by the soap-maker exactly as in the case of the employment of hydrochloric acid.

In carrying out our invention we add to the spent soap-lye chloride of calcium, preferably in solution, until no further precipitate is produced. We next remove the clear liquor from the precipitate and concentrate it by boiling until it reaches concentration-point, (preferably to a temperature of about 150° centigrade,) thus producing crude glycerine; or in case the spent lye is very impure we may give it a preliminary treatment with either lime or chloride of calcium, and after the removal of the precipitate thus formed partially concentrate the clear liquor, and then in that condition treat it with chloride of calcium, and after removing the precipitate proceed with the final concentration. During the concentration chloride of sodium crystallizes. This we remove from the liquor, and it may be washed by known means and used again in the manufacture of soap.

It is preferable to make the solution of chloride of calcium by dissolving it to saturation-point in a portion of spent soap-lye, in order to avoid the introduction of unnecessary water, which would afterward have to be eliminated by vaporization; but as will be easily understood, a solution of the chloride in water answers the purpose, or the chloride may be added in a solid condition.

The action of the chloride of calcium upon the spent lye is as follows: It enters into combination with the free alkali contained therein, forming, by double decomposition with the carbonate of soda, chloride of sodium and carbonate of lime, and with the caustic soda chloride of sodium and hydrate of lime. It renders insoluble the organic impurities, which, being thus turned out of solution in the presence of the finely-divided carbonate of lime, combine mechanically therewith, forming a precipitate from which the clear liquor thus purified may be removed by decantation or filtration and concentrated for the elimination of the water and recovery of the chloride of sodium and glycerine. This is the simplest form of practicing our invention; but it will be understood that it may be used as a step in more elaborate treatments or in conjunction with other steps. For example, in the case of the spent soap-lye containing a proportion of alkali large enough to render it worth while to recover the same in combination as a soap, the spent lye may be first treated with lime and partially concentrated, and then boiled with fat or a fatty acid or rosin, whereby the greater proportion of such free alkali will be removed, and the lye may then be treated according to our process herein described, or the chloride of calcium may be employed in sufficient quantities only to bring about the same result as would be derived by neutralizing the lye with an acid, and for the complete removal of the remaining organic impurities recourse may be had to the addition of suitable metallic salts, such as those employed in the processes described in United States Patent No. 413,619, or in the pending application of Albert Domeier and Otto Christian Hagemann, Serial No. 320,021, and the precipitate formed by these joint treatments removed and the concentration proceeded with; or, instead of using metal salts, the precipitate formed by chloride of calcium may be removed from the clear liquor, and then a small proportion of free acid may be added to the liquor, any precipitate thus formed removed, and the concentration proceeded with; or, in addition to the steps just described, in case any excess of free acid or metal salts have been employed the same may be neutralized or precipitated by a suitable alkali previous to final concentration, it being clearly understood that the treatment with chloride of calcium is available as a step in any process or processes in which free acid (or fat, fatty acid, or rosin) is employed to neutralize the free alkali contained in the spent soap-lye or to precipitate and remove organic impurities therefrom.

Having now described our invention and the manner in which the same is to be performed and how it may be introduced, as a useful step in other processes, what we claim is—

The improvement in the art of recovering glycerine and salt from spent soap-lye containing saponaceous matters in solution, which consists in adding to the lye chloride of calcium, substantially as and for the purpose described.

OTTO CHRISTIAN HAGEMANN.
EBENEZER KENNARD MITTING.

Witnesses to the signature of O. C. Hagemann:
OLIVER R. JOHNSON,
A. E. WOODWARD,
 *Consulate-General, U. S. A., London.*

Witnesses to the signature of E. K. Mitting:
C. C. LINTHICUM,
FREDERICK C. GOODWIN.